(12) United States Patent
Yabe

(10) Patent No.: US 6,354,420 B1
(45) Date of Patent: Mar. 12, 2002

(54) DAMPER APPARATUS FOR A LOCK-UP CLUTCH

(75) Inventor: Hiroshi Yabe, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/350,990

(22) Filed: Jul. 12, 1999

Related U.S. Application Data

(63) Continuation of application No. 09/018,396, filed on Feb. 4, 1998, now abandoned.

(30) Foreign Application Priority Data

Feb. 5, 1997 (JP) .............................................. 9-022859

(51) Int. Cl.$^7$ ........................... F16D 3/14; F16D 47/02; F16D 69/00
(52) U.S. Cl. ........................ 192/212; 192/3.28; 464/67; 29/469
(58) Field of Search ............................. 192/3.28, 3.29, 192/3.3, 212; 464/66, 67; 29/469

(56) References Cited

U.S. PATENT DOCUMENTS

| | | | | |
|---|---|---|---|---|
| 4,580,668 A | * | 4/1986 | Pickard et al. .............. | 192/3.29 |
| 4,702,721 A | * | 10/1987 | Lamarche ..................... | 464/66 |
| 4,987,980 A | * | 1/1991 | Fujimoto ..................... | 192/3.28 |
| 5,203,835 A | * | 4/1993 | Kohno et al. .............. | 192/3.28 |
| 5,772,515 A | * | 6/1998 | Yamakawa et al. ......... | 192/3.29 |
| 5,784,929 A | * | 7/1998 | Abraham et al. ............. | 464/67 |
| 5,975,261 A | * | 11/1999 | Woerner et al. ........... | 192/3.29 |

* cited by examiner

Primary Examiner—Rodney H. Bonck
Assistant Examiner—Tisha D. Lewis
(74) Attorney, Agent, or Firm—Miles & Stockbridge P.C.

(57) ABSTRACT

In a damper apparatus for a lock-up clutch having a spring disposed in a lock-up piston, a retainer plate and a guide member covering the spring are integrally pre-assembled to provide a unit, and the unit is disposed in the piston by a necessary torque capacity. Also, the unit holds a plurality of springs disposed in series.

30 Claims, 6 Drawing Sheets

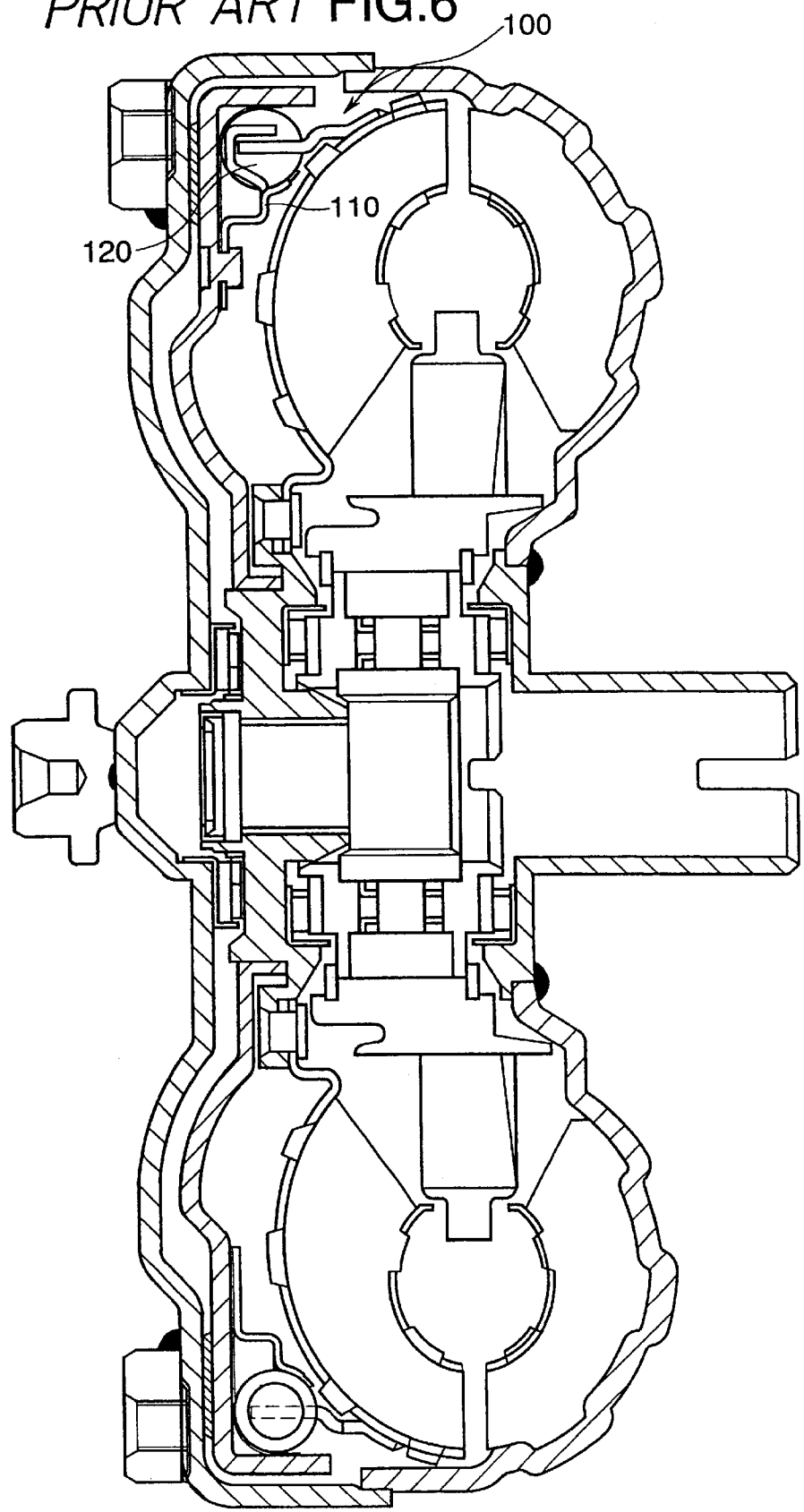
PRIOR ART FIG.6

DAMPER APPARATUS FOR A LOCK-UP CLUTCH

CROSS-REFERENCE TO RELATED APPLICATION

This application is a continuation of Application No. 09/018,396 filed Feb. 4, 1998 and now abandoned.

BACKGROUND OF THE INVENTION

1. Field of the Invention

This invention relates to a damper apparatus used to absorb a sudden torque fluctuation in a torque converter with a lock-up mechanism for an automatic transmission of a vehicle.

2. Related Background Art

Generally, a torque converter transmits power through a fluid and can therefore realize smooth running. But it suffers from the disadvantage that fuel consumption is increased due to the energy loss attributable to the slip of the fluid. To solve this, recent torque converters are provided with a lock-up mechanism.

The lock-up mechanism is a mechanism which comprises a lock-up clutch having a frictional surface and in which, when the vehicle speed becomes a predetermined speed or higher, the flow of a fluid in the torque converter automatically changes and urges the frictional surface of the piston of the lock-up clutch against the front cover of the torque converter to thereby directly connect an engine and drive wheels together. Thereby, the influence of the slip of the fluid is eliminated and an improvement in fuel consumption can be achieved.

In such a torque converter, a damper apparatus comprising a plurality of springs is provided to absorb a sudden torque fluctuation from the engine when the piston (lock-up piston) of the lock-up clutch becomes fastened to and liberated from the front cover of the torque converter.

For example, in a damper apparatus disclosed in Japanese Laid-Open Patent Application No. 5-172185, a ring-molded retainer plate and the flange of the outer diameter of a piston are curled to thereby hold a spring. The spring is contained in a spring holding portion molded on the retainer plate and the flange. Also, in a damper apparatus 100 for a lock-up clutch according to the prior art shown in FIG. 6 of the accompanying drawings, a spring 120 is held by only a retainer plate 110.

Generally, when manufacturing the retainer plate the yield of its material is poor because of ring molding, and a complicated drawing process is required. Also, high accuracy of press working is necessary due to the adverse effect of quenching distortion or the like. The shaping of the outer diameter of the piston is also complicated. Also, a novel design has been necessary for the change of the characteristic of spring recombination and a lock-up clutch having a different diameter. Particularly, in the prior art as shown in FIG. 6, the retainer plate receives a spring load in a cantilever fashion and therefore, in the setting of a high load, damage has sometimes occurred from the seam between the load transmitting portion and the spring holding portion of the retainer plate.

The retainer plate and a guide member covering the spring are integrally pre-assembled to provide a unit, and the unit is disposed in the piston by a necessary torque capacity. Also, the unit holds a plurality of springs disposed in series.

SUMMARY OF THE INVENTION

It is an object of the present invention to provide a damper apparatus for a lock-up clutch in which springs of the same type can be mounted on individual lock-up clutches of different diameters and a unit enables the springs to be disposed in series depending on a set characteristic and a unit construction is provided, whereby spring holding structure becomes strong and a high capacity is obtained by a small number of parts and the degree of freedom of disposition is improved.

To achieve the above object, the present invention provides a damper apparatus for a lock-up clutch in which a spring is disposed on a lock-up piston, comprising:

a retainer plate containing the spring therein; and a guide member provided in opposed relationship with the retainer plate for holding the spring with the retainer plate;

characterized in that the retainer plate and the guide member are made integral with each other with the spring interposed therebetween and are constructed as a damper unit.

BRIEF DESCRIPTION OF THE DRAWINGS

FIG. 6 is a cross-sectional view showing a damper apparatus according to the prior art.

DESCRIPTION OF THE PREFERRED EMBODIMENTS

Figure 1:
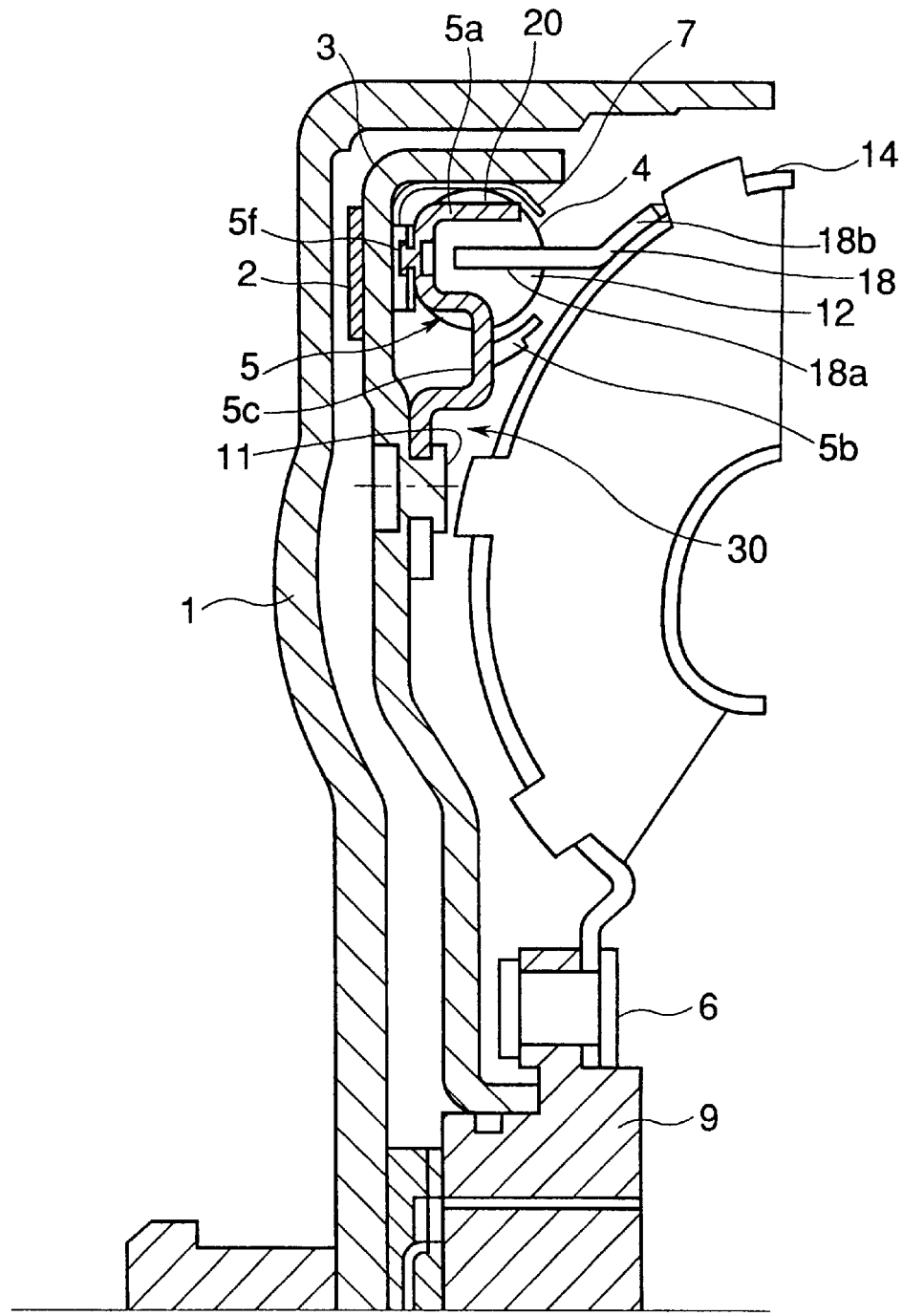
FIG. 1 is an axial fragmentary cross-sectional view showing a damper apparatus according to a first embodiment of the present invention.

The present invention will hereinafter be described in detail with reference to the drawings. Of course, the embodiments which will hereinafter be described are only illustrative of the present invention and do not restrict the present invention. In the drawings, like portions are designated by like reference characters.

FIG. 1 is an axial fragmentary cross-sectional view showing a damper apparatus 30 according to a first embodiment of the present invention. FIG. 1 shows the liberated state of a lock-up clutch.

The damper apparatus 30 is provided with an input piston, i.e., a lock-up piston 3, a retainer plate 5 holding springs 4, and a guide member 7. The lock-up piston 3 is provided with a projection 11, and the retainer plate 5 is fitted to this projection 11, and is caulked there and fixed to the lock-up piston 3. The springs 4 are held at their axial end surfaces by an output plate, i.e., an output member 18, through a spacer 12 which will be described later. The springs 4 are torsion springs.

A frictional material 2 is attached to the outer surface of the lock-up piston 3, as shown. Thus, when the lock-up piston 3 axially slides and bears against the inner surface of a front cover 1, the lock-up piston 3 comes into close contact with the front cover 1 with the frictional material 2 interposed therebetween, and assumes a fastened state in which the transmission of torque is effected with the front cover and the lock-up piston directly connected together.

A turbine liner 14 which is the output member of a torque converter portion is fixed to a turbine hub 9 by a rivet 6.

Also, an output plate 18 is fixed to the turbine liner 14 at a fixed end portion 18b as by welding.

Figure 2:
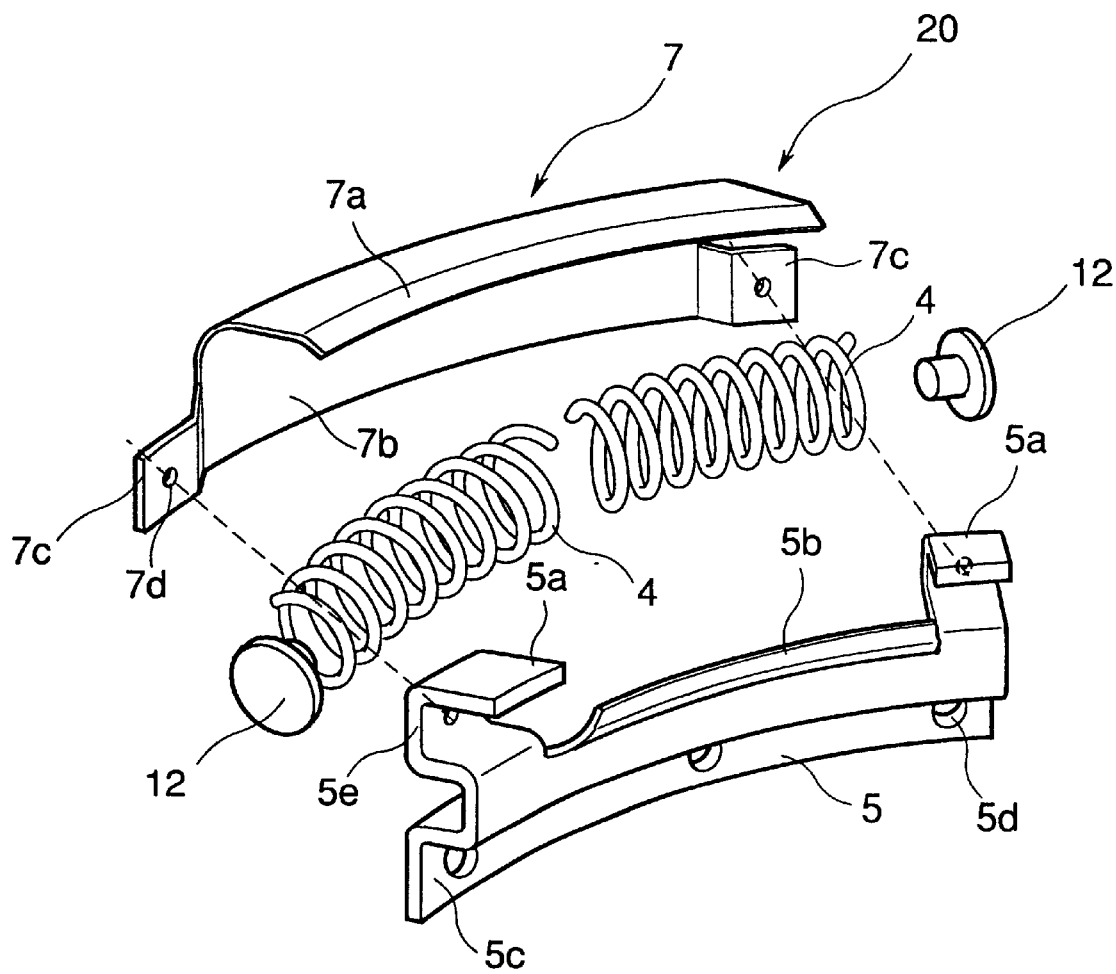
FIG. 2 is an exploded perspective view of the damper unit of FIG. 1.

The retainer plate 5 and the guide member 7 will now be described in detail with reference to FIG. 2. FIG. 2 is an exploded perspective view showing the relation between the retainer plate 5 and the guide member 7.

The arcuately curved guide member 7, in the embodiment, comprises a cover portion 7a comprised of a plate integrally upwardly extending from a body portion 7b and curved, and fixing portions 7c cicumferentially extending from the opposite ends of the body portion 7b. Each of the fixing portions 7c is formed with a through-aperture 7d.

The retainer plate 5 arcuately curved complementarily to the guide member 7 is formed by a plate thicker than the guide member 7. The plate 5 has a holding portion 5b integrally upwardly extending from a body portion 5c and holding the springs 4, and fixing convex portions 5e upwardly extending from the opposite ends of the body portion 5c for fixing the guide member 7. The upper portions of the fixing convex portions 5e provide free end portions 5a. The fixing convex portions 5e and the free end portions 5a together form an S-shape as viewed from the circumferential direction.

The springs 4 are held in such a manner as to be sandwiched between the guide member 7 and the retainer plate 5. In the case of the present embodiment, two identical springs are disposed in series. Spacers 12 are fitted to the opposite ends of the two springs disposed in series. The springs 4, like the retainer plate 5 and the guide member 7, are arcuately curved. The springs 4 are held in contact with the cover portion 7a and body portion 7b of the guide member 7.

In FIG. 2, the two springs 4 disposed in series, with the spacers 12 inserted in the opposite ends thereof, are sandwiched between the guide member 7 and the retainer plate 5. At this time, the fixing portions 7c provided at the opposite ends of the guide member 7 and the fixing convex portions 5e of the retainer plate 5 are caulked while sandwiching the springs 4 therebetween, whereby they are integrally fixed and a damper unit 20 in its sub-assembled state is formed. Projected portions 5f (FIG. 1) formed on the backs of the fixing convex portions 5e of the retainer plate 5 are inserted into the through-apertures 7d in the guide member 7 and caulked, whereby the guide member 7 and the retainer plate 5 are integrally fixed. FIG. 1 shows a state in which the parts are incorporated in the damper apparatus 30 in this manner.

As can be seen from FIGS. 1 and 2, the springs 4 disposed in the damper unit 20 are radically held by the holding portion 5b of the retainer plate 5 and the cover portion 7a of the guide member 7, and are circumferentially held between the circumferentially inner end surfaces of the free end portions 5a of the retainer plate 5.

The damper unit 20 is fixed to the inner surface of the lock-up piston 3 by the through-apertures 5d formed at the opposite ends and center of the body portion 5c of the retainer plate 5 being inserted over projections formed on the inner surface of the lock-up piston 3 and caulked. FIG. 1 shows this state. The circumferential end portions of the springs 4 bear against the end portions 18a of the output plate 18 with the spacers 12 interposed therebetween.

Figure 3:
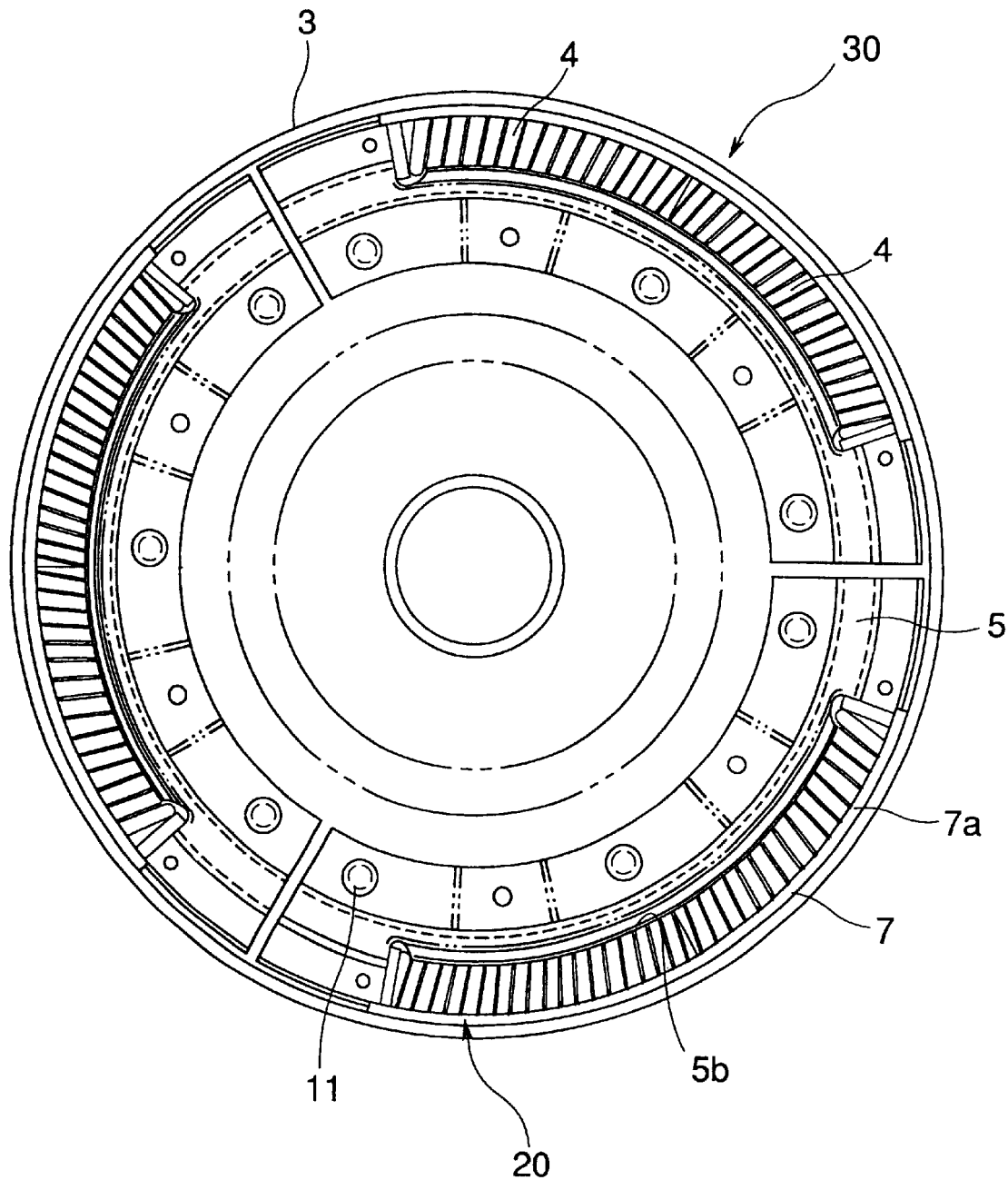
FIG. 3 is a front view of the damper apparatus of FIG. 1.

FIG. 3 is a front view of the damper apparatus 30 as it is seen from the right direction in FIG. 2. Three damper units 20 of the damper apparatus 30 are circumferentially symmetrically arranged.

Figure 4:
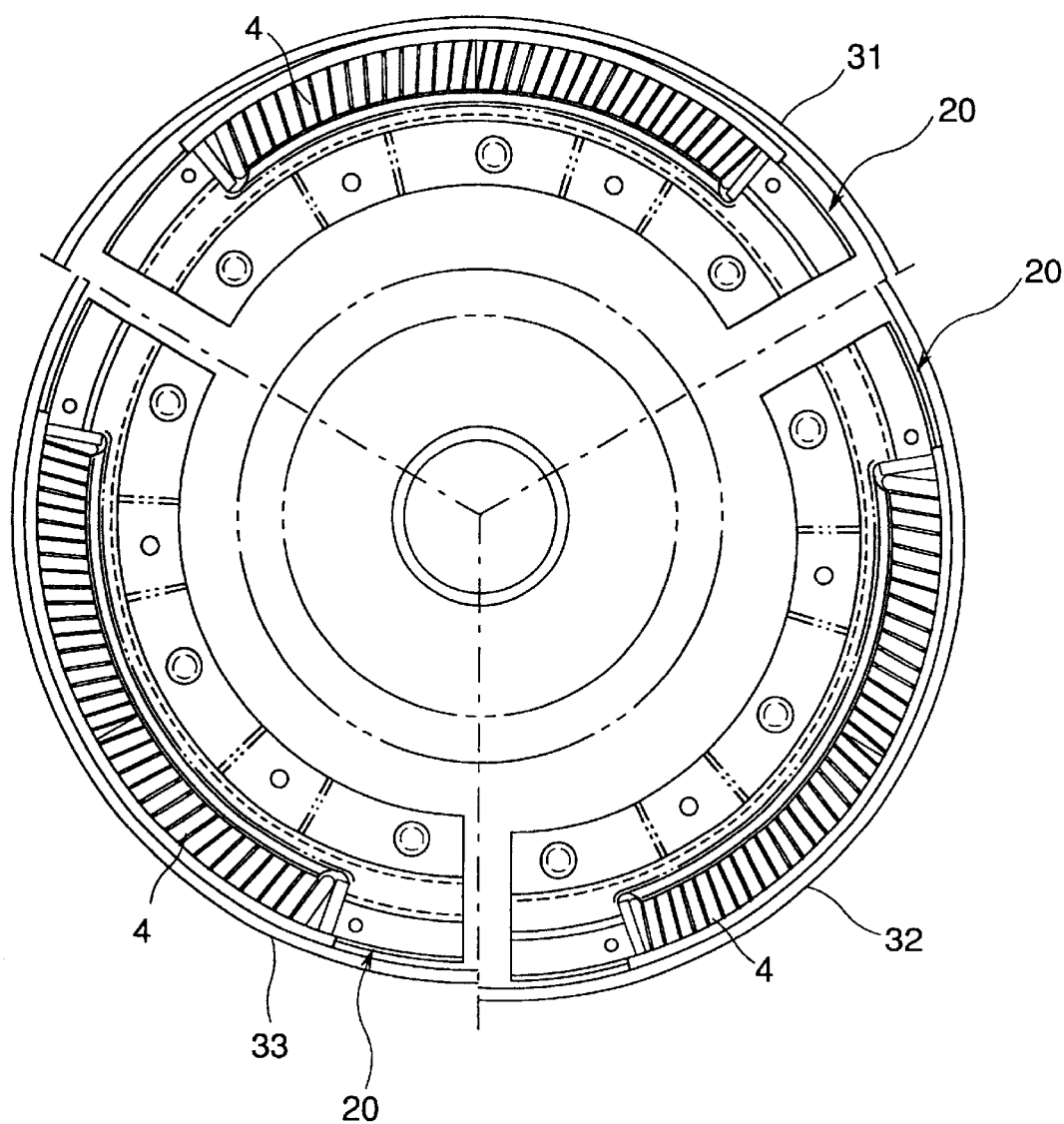
FIG. 4 is a front view of a damper apparatus showing an example in which the damper units of the present invention are applied to lock-up pistons of different diameters.

FIG. 4 is a front view of the damper apparatus showing an example in which the damper units of the present embodiment are applied to lock-up pistons of different diameters. It shows that identical damper units 20 can be used in three lock-up pistons 31, 32 and 33 of different diameters. Each of the lock-up pistons 31, 32 and 33 having large, medium and small diameters, respectively, is shown by one-third thereof. Actually, three damper units 20 are provided with respect to the lock-up pistons of respective diameters.

Figure 5:
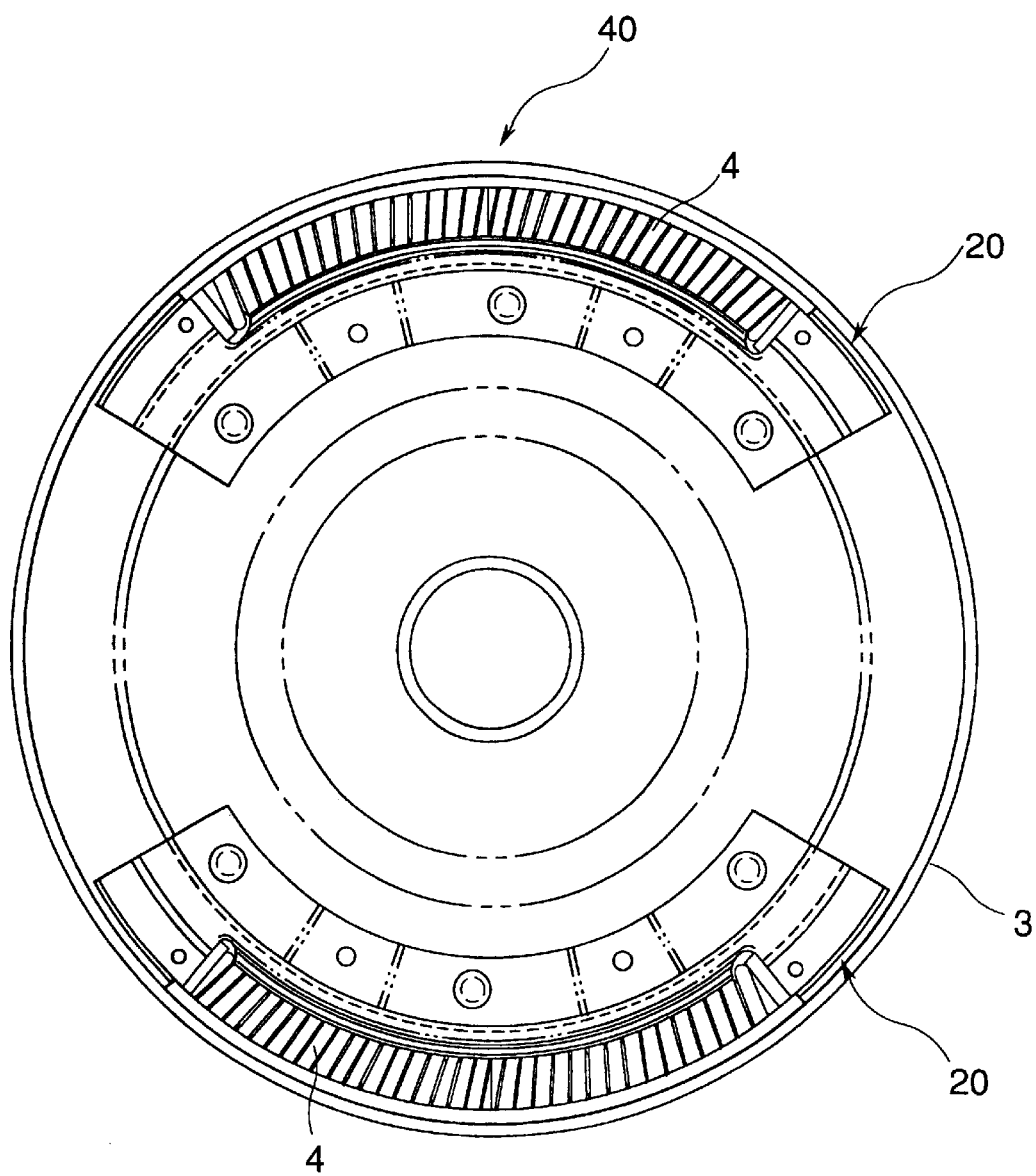
FIG. 5 is a front view of a damper apparatus according to another embodiment of the present invention.

FIG. 5 is a front view of a damper apparatus 40 according to another embodiment of the present invention. In this embodiment, two damper units 20 are circumferentially symmetrically disposed.

In each embodiment described above, two or three damper units are circumferentially symmetrically disposed, but the number of damper units can be further increased in conformity with necessary torque. Also, in the above-described embodiments, the two springs 4 contained in each damper unit 20 are disposed in series, but more than two springs can also be disposed in series in conformity with necessary torque. Conversely, a single spring can also be provided.

The torque transmitting route in each of the above-described embodiments is as follows:

a torque converter (input) fixed to the output shaft of an engine→front cover 1→frictional plate 2→lock-up piston 3→retainer plate 5→spacer 12→spring 4→spring 4→spacer 12→output plate 18→turbine hub 7 (output).

The retainer plate becomes compact and therefore, the yield of the material is improved and the cost of the material can be curtailed.

The damper apparatus of the present invention becomes also mountable on a lock-up clutch having lock-up pistons of different diameters, and a high capacity can be maintained by a smaller number of springs disposed. The cost can be suppressed without complicated working being done. Also, the angle of torsion of the springs can be made great and vibration attenuation property is improved to thereby increase the operation range of the lock-up clutch, and a fuel consumption reducing effect can be obtained.

What is claimed is:

1. A damper apparatus for a lock-up clutch having a lock-up piston, comprising:
   a plurality of pre-assembled damper units, each including a retainer plate, a guide member coupled to said retainer plate in an opposed relationship, and at least one spring held by said retainer plate and said guide member;
   said damper units being individually mounted at equal circumferential intervals on an outer peripheral side of said lock-up piston.

2. The damper apparatus of claim 1, wherein each damper unit includes a plurality of springs held in series by said retainer plate and said guide member.

3. The damper apparatus of claim 1, wherein three of said damper units are mounted at equal circumferential intervals on the outer peripheral side of said lock-up piston.

4. The damper apparatus of claim 1, wherein two of said damper units are mounted at equal circumferential intervals on the outer peripheral side of said lock-up piston.

5. The damper apparatus of claim 1, wherein circumferentially outermost spring-ends of each damper unit are provided with spacers.

6. The damper apparatus of claim 1, further comprising an output plate effecting torque transmission, wherein end portions of said output plate are in contact with end portions of said damper units.

7. The damper apparatus of claim 1, wherein circumferentially outermost spring-ends of each damper unit are supported by said retainer plate.

8. The damper apparatus of claim 2, wherein each damper unit includes two springs held in series by said retainer plate and said guide member.

9. The damper apparatus of claim 2, wherein circumferentially outermost spring-ends of each damper unit are provided with spacers.

10. The damper apparatus of claim 3, further comprising an output plate effecting torque transmission, wherein end portions of said output plate are in contact with end portions of said damper units.

11. The damper apparatus of claim 4, further comprising an output plate effecting torque transmission, wherein end portions of said output plate are in contact with end portions of said damper units.

12. The damper apparatus of claim 8, wherein three damper units are mounted at equal circumferential intervals on the outer peripheral side of said lock-up piston.

13. The damper apparatus of claim 8, wherein two damper units are mounted at equal circumferential intervals on the outer peripheral side of said lock-up piston.

14. The damper apparatus of claim 5, further comprising an output plate effecting torque transmission, wherein end portions of said output plate are in contact with said spacers.

15. The damper apparatus of claim 9, further comprising an output plate effecting torque transmission, wherein end portions of said output plate are in contact with said spacers.

16. A method of constructing a damper apparatus for a lock-up clutch having a lock-up piston comprising:

providing a plurality of pre-assembled damper units, each including a retainer plate, a guide member coupled to said retainer plate in an opposed relationship, and at least one spring held by said retainer plate and said guide member; and mounting said damper units at equal circumferential intervals on an outer peripheral side of said lock-up piston.

17. The method of claim 16, wherein each damper unit includes a plurality of springs provided in series.

18. The method of claim 16, wherein three damper units are mounted at equal circumferential intervals on an outer peripheral side of said lock-up piston.

19. The method of claim 16, wherein two damper units are mounted at equal circumferential intervals on an outer peripheral side of said lock-up piston.

20. The method of claim 16, wherein spacers are provided on circumferentially outermost spring-ends within each of said damper units.

21. The method of claim 16, wherein said damper units are mounted such that end portions thereof contact end portions of an output plate effecting torque transmission.

22. The method of claim 16, wherein circumferentially outermost spring-ends of each damper unit are supported by said retainer plate.

23. The method of claim 17, wherein each damper unit includes two springs provided in series.

24. The method of claim 17, wherein spacers are provided on circumferentially outermost spring-ends within each of said damper units.

25. The method of claim 18, wherein said damper units are mounted such that end portions thereof contact end portions of an output plate effecting torque transmission.

26. The method of claim 19, wherein said damper units are mounted such that end portions thereof contact end portions of an output plate effecting torque transmission.

27. The method of claim 23, wherein three damper units are mounted at equal circumferential intervals on the outer peripheral side of said lock-up piston.

28. The method of claim 23, wherein two damper units are mounted at equal circumferential intervals on the outer peripheral side of said lock-up piston.

29. The method of claim 20, wherein said damper units are mounted such that said spacers contact end portions of an output plate effecting torque transmission.

30. The method of claim 24, wherein said damper units are mounted such that said spacers contact end portions of an output plate effecting torque transmission.

* * * * *